United States Patent
Yu

(10) Patent No.: US 12,368,943 B2
(45) Date of Patent: Jul. 22, 2025

(54) ELECTRONIC DEVICE INCLUDING CAMERA MODULE

(71) Applicant: SAMSUNG ELECTRONICS CO., LTD., Suwon-si (KR)

(72) Inventor: Youngbok Yu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 205 days.

(21) Appl. No.: 18/174,654

(22) Filed: Feb. 27, 2023

(65) Prior Publication Data

US 2023/0224564 A1    Jul. 13, 2023

Related U.S. Application Data

(63) Continuation of application No. PCT/KR2022/011154, filed on Jul. 29, 2022.

(30) Foreign Application Priority Data

Sep. 13, 2021 (KR) .................. 10-2021-0121881

(51) Int. Cl.
*H04N 23/54* (2023.01)
*H04N 23/68* (2023.01)

(52) U.S. Cl.
CPC .......... *H04N 23/54* (2023.01); *H04N 23/68* (2023.01)

(58) Field of Classification Search
None
See application file for complete search history.

(56) References Cited

U.S. PATENT DOCUMENTS

| 9,915,802 | B2 | 3/2018 | Murakami et al. |
| 10,036,896 | B2 | 7/2018 | Hee et al. |
| 10,401,589 | B2 | 9/2019 | Murakami |

(Continued)

FOREIGN PATENT DOCUMENTS

| CN | 113376794 A | 9/2021 |
| JP | 6458378 B2 | 1/2019 |

(Continued)

OTHER PUBLICATIONS

International Search Report mailed Nov. 30, 2022 for PCT/KR2022/011154. In conformance with MPEP 609—Concise explanation of the relevance includes issue date of foreign OA and references cited therein.

*Primary Examiner* — James M Hannett
(74) *Attorney, Agent, or Firm* — CANTOR COLBURN LLP

(57) ABSTRACT

A camera module according to an embodiment of the present disclosure may include: a base defining at least a portion of a lower exterior of the camera module; a plurality of magnets disposed on the base about an optical axis; an auto focus (AF) coil disposed to surround the plurality of magnets while being spaced apart from the plurality of magnets by a predetermined distance; an AF carrier coupled to the AF coil and configured to be movable along the optical axis together with the AF coil; an optical image stabilization (OIS) carrier disposed to be movable in a direction perpendicular to the optical axis within a space defined by the AF coil and the AF carrier; a plurality of OIS coils coupled to an external portion of the OIS carrier to face of the plurality of magnets; and a lens assembly disposed on the OIS carrier.

21 Claims, 15 Drawing Sheets

(56) References Cited

U.S. PATENT DOCUMENTS

| | | | |
|---|---|---|---|
| 10,571,649 B2 | 2/2020 | Osaka et al. | |
| 10,863,094 B2 | 12/2020 | Sharma et al. | |
| 11,048,147 B2 | 6/2021 | Sharma | |
| 2016/0161757 A1* | 6/2016 | Hee ..................... | G02B 27/646 |
| | | | 359/557 |
| 2019/0011723 A1* | 1/2019 | Park ..................... | G02B 27/646 |
| 2019/0196300 A1 | 6/2019 | Kim et al. | |
| 2022/0385794 A1* | 12/2022 | Wang .................... | H04N 23/57 |

FOREIGN PATENT DOCUMENTS

| | | |
|---|---|---|
| JP | 2019-135519 A | 8/2019 |
| JP | 2019-219670 A | 12/2019 |
| KR | 10-2015-0009685 A | 1/2015 |
| KR | 10-2017-0141523 A | 12/2017 |
| KR | 10-1825731 B1 | 3/2018 |
| KR | 101931956 B1 | 12/2018 |
| KR | 10-2020-0003762 A | 1/2020 |
| KR | 10-2021-0010614 A | 1/2021 |
| KR | 20220148665 A | 11/2022 |
| KR | 102563645 B1 | 8/2023 |

\* cited by examiner

ELECTRONIC DEVICE INCLUDING CAMERA MODULE

CROSS-REFERENCE TO RELATED APPLICATION(S)

This application is a continuation application, claiming priority under § 365(c), of an international application No. PCT/KR2022/011154, filed on Jul. 29, 2022, which is based on and claims the benefit of a Korean patent application number 10-2021-0121881, filed on Sep. 13, 2021, in the Korean Intellectual Property Office, the disclosure of which is incorporated by reference herein in its entirety.

FIELD

Various embodiments of the present document relate to a camera module capable of performing an image stabilization function (e.g., optical image stabilization (OIS)) and an auto focus function (e.g., auto focus (AF)), and an electronic device including the camera module.

DESCRIPTION OF RELATED ART

As electronic devices including cameras become common and user demands for obtaining high-quality images by using the cameras increase, camera-related technologies are being increasingly advanced.

In relation to image quality improvement, there has been proposed a camera that includes structures capable of performing AF and OIS in order to focus on a subject or reduce the effect of motion/shake while photographing a subject. For example, a camera structure is designed based on a fixed coil and movable magnets so that AF and OIS can be performed.

SUMMARY

In the case of performing AF and/or OIS based on the movement of a fixed coil and a magnet in an electronic device, when an external magnetic material is disposed close to a camera module, there may be a problem in that AF and OIS performances are deteriorated due to the influence of the external magnetic material.

In an electronic device, current may be greatly consumed by controlling the movement of a magnet, and there may be a limit in the design of an electronic device or a camera due to a space limitation due to the disposition of the magnet.

According to the present disclosure, since a coil is moved for AF and OIS, the influence of the external magnetic material disposed close to the camera module may be reduced and the degree of freedom in design inside the device may be improved.

A camera module according to an embodiment of the present disclosure may include: a base defining at least a portion of a lower exterior of the camera module; a plurality of magnets disposed on the base about an optical axis of the camera module; an auto focus (AF) coil disposed to surround the plurality of magnets while being spaced apart from the plurality of magnets by a predetermined distance; an AF carrier coupled to the AF coil and movable together with the AF coil; an optical image stabilization (OIS) carrier disposed to be movable in a direction perpendicular to the optical axis within a space defined by the AF coil and the AF carrier; a plurality of OIS coils coupled to an external portion of the OIS carrier to face the plurality of magnets; and a lens assembly disposed on the OIS carrier.

An electronic device according to an embodiment of the present disclosure may include: a camera module; and a processor electrically connected to the camera module, wherein the camera module may include: a base defining at least a portion of a lower exterior of the camera module; a plurality of magnets disposed on the base about an optical axis; an auto focus (AF) coil disposed to surround the plurality of magnets while being spaced apart from the plurality of magnets by a predetermined distance; an AF carrier coupled to the AF coil and configured to be movable along the optical axis together with the AF coil; an optical image stabilization (OIS) carrier disposed to be movable in a direction perpendicular to the optical axis within a space defined by the AF coil and the AF carrier; a plurality of OIS coils coupled to an external portion of the OIS carrier to face the plurality of magnets; and a lens assembly disposed on the OIS carrier, and wherein the processor may be configured to: control a first current applied to the AF coil such that the lens assembly moves along the optical axis; and control a second current applied to the plurality of OIS coils such that the lens assembly moves in a direction perpendicular to the optical axis.

According to various embodiments of the present disclosure, even if an external magnetic material is disposed close to the coil and the magnet, the effect of the external magnetic material on AF and OIS performances may be effectively reduced.

According to various embodiments of the present disclosure, since the coil moves for AF and OIS, current consumption may be reduced, and design freedom of the electronic device or the camera may be improved due to a space limitation.

Effects that can be obtained based on various embodiments are not limited to those described above, and other effects not described above will be clearly understood by a person ordinarily skilled in the art to which the disclosure belongs based on the following description.

DETAILED DESCRIPTION

Figure 1:
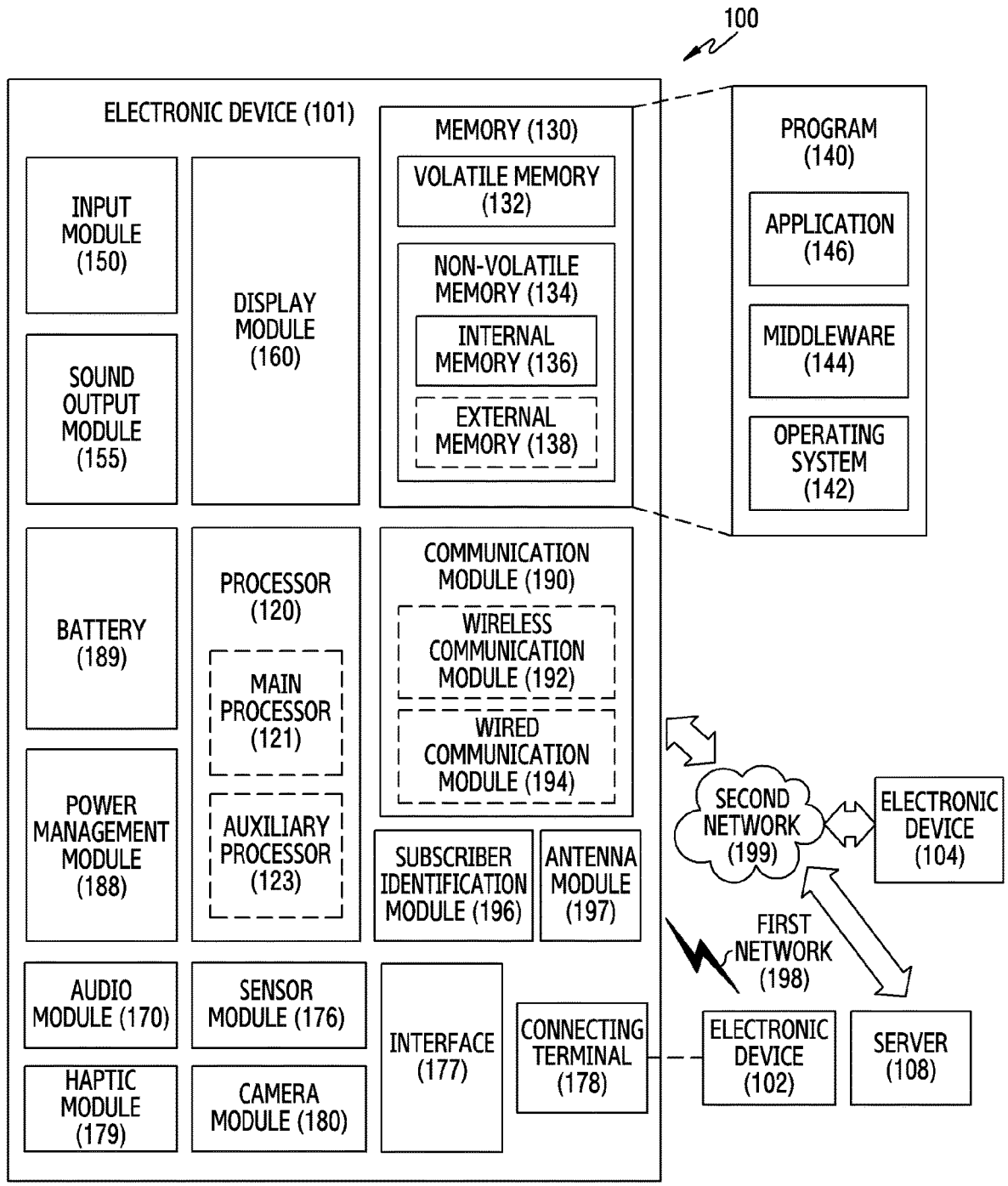
FIG. 1 is a block diagram of an electronic device according to an embodiment in a network environment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
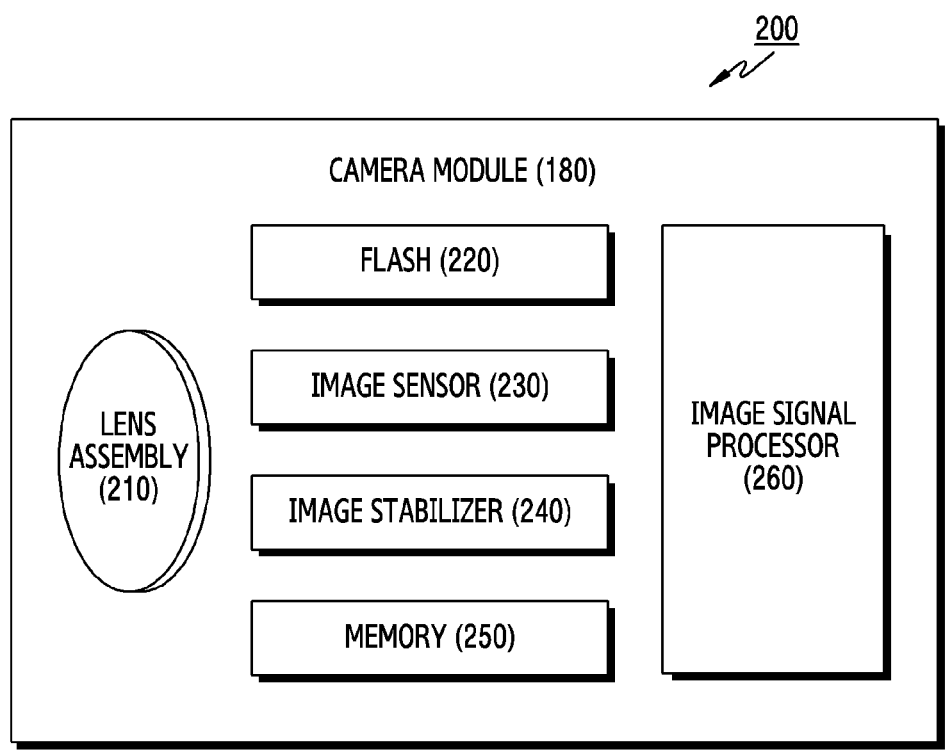
FIG. 2 is a block diagram exemplifying a camera module according to an embodiment.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light, emitted or reflected from the object and transmitted via the lens assembly 210, into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
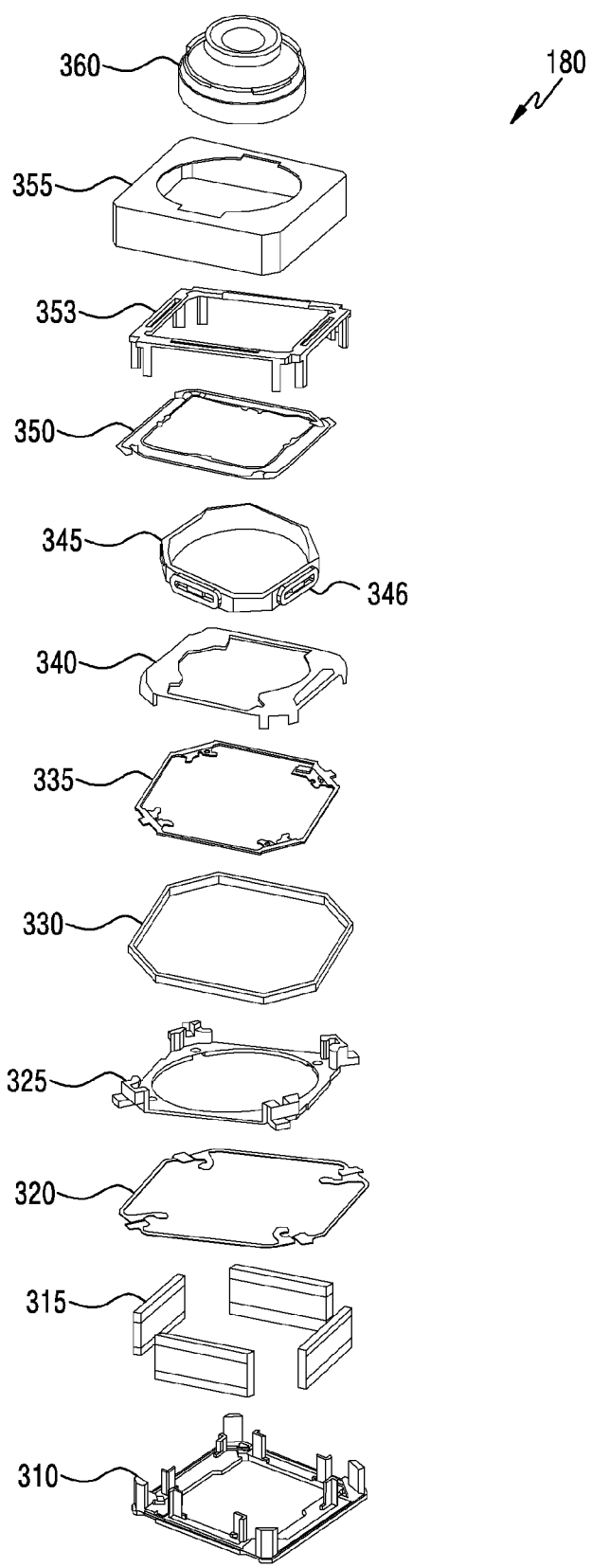
FIG. 3 is a view illustrating a camera module according to an embodiment in a disassembled state.

FIG. 3 is a view illustrating a camera module according to an embodiment in a disassembled state.

According to an embodiment, the electronic device 101 may control components included in the camera module 180 under the control of the processor 120. For example, the electronic device 101 may at least transmit/receive power and/or a control signal via a base 310 of the camera module 180 under the control of the processor 120.

According to an embodiment, the base 310 may be disposed in the lower portion of the camera module 180. For example, the base 310 may define at least a portion of the lower exterior of the camera module 180.

According to an embodiment, a plurality of magnets 315 may be disposed on the base 310. The camera module 180 may include a plurality of magnets 315 disposed on the base 310 about an optical axis (e.g., the z axis) of the camera module 180. For example, the plurality of magnets 315 may be disposed on the base 310 symmetrically about the optical axis. The plurality of magnets 315 may be disposed in the +x direction, the +y direction, the −x direction, and the −y direction about the optical axis (e.g., the z axis, See FIG. 5).

According to an embodiment, the plurality of magnets 315 may be fixed to the base 310. For example, the plurality of magnets 315 may be fixedly disposed by being bonded to the base 310.

According to an embodiment, the plurality of magnets 315 may be two magnets or four magnets. For example, the plurality of magnets 315 may include at least two magnets disposed perpendicular to each other. That is, the at least two magnets may extend in directions perpendicular to each other, respectively. The above-described number for the magnets is an example, and the number of magnets 315 may not be limited.

According to an embodiment, an AF lower spring 320 may be disposed on the upper end of the base 310. For example, the AF lower spring 320 may be disposed on the base 310 by being bonded to the base 310. In an embodiment, the AF lower spring 320 may be disposed to support the plurality of magnets 315 on the base 310. The AF lower spring 320 may have a shape of at least partially surrounding side surfaces of the plurality of magnets 315 to support the side surfaces of the plurality of magnets 315.

According to an embodiment, the AF lower carrier 325 may be coupled on the AF lower spring 320. The camera module 180 may include the AF lower spring 320 disposed between the AF lower carrier 325 and the base 310.

Figure 5:
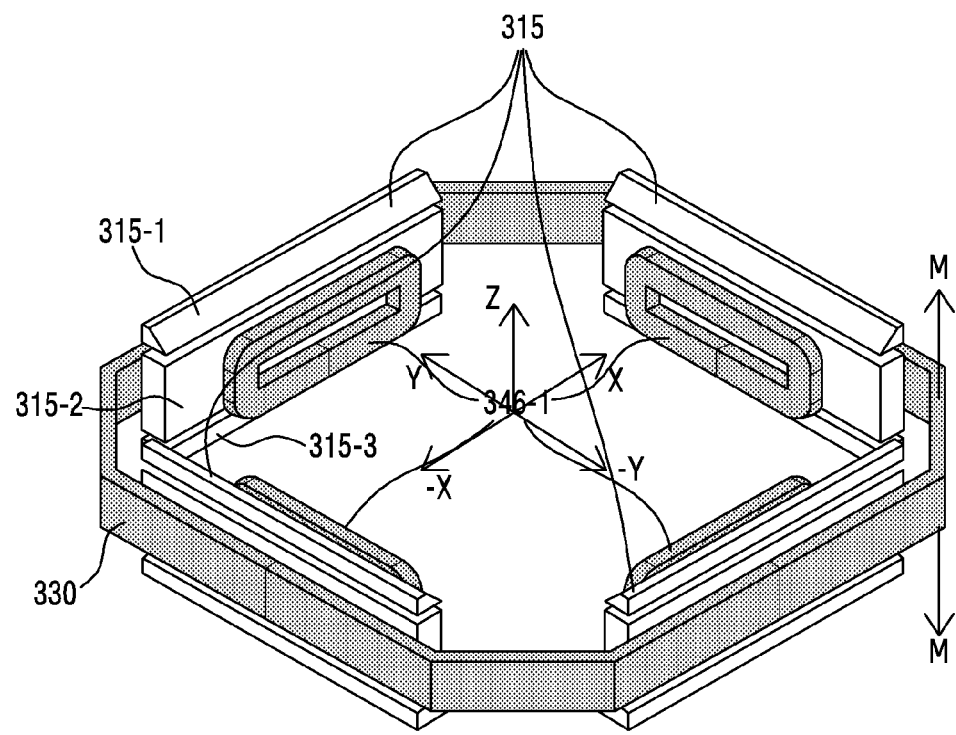
FIG. 5 is a view illustrating a disposition relationship of an AF coil, a plurality of magnets, and a plurality of OIS coils of a camera module according to an embodiment.

According to an embodiment, the AF coil 330 may be disposed to surround the plurality of magnets 315 (See FIG. 5). The AF coil 330 may be disposed to surround the plurality of magnets 315 while being spaced apart from the plurality of magnets 315 by a predetermined distance.

According to an embodiment, the AF coil 330 may be coupled on the AF lower carrier 325. The AF coil 330 may have a shape surrounding the outer surfaces of the plurality of magnets 315 on the AF lower carrier 325 while being spaced apart from the plurality of magnets 315 by a predetermined distance.

According to an embodiment, the AF coil 330 may move along the optical axis (e.g., z axis) by interaction (e.g., a magnetic force) with the plurality of magnets 315. For example, the processor 120 may control a first current applied to the AF coil 330, and as the first current is controlled, the AF coil 330 may move along the optical axis by the magnetic force between the AF coil 330 and the plurality of magnets 315. For example, the AF coil 330 may move along the optical axis together with the AF lower carrier 325 and the AF upper carrier 340 coupled thereto.

According to an embodiment, an AF flexible printed circuit board (FPCB) and AF driver 335 may be coupled on the AF coil 330. The AF FPCB and AF driver 335 may include an AF FPCB 335-1 and an AF driver 335-2, and in the following description made with reference to FIGS. 4 and 8, the AF FPCB and AF driver 335 may be described separately as the AF FPCB 335-1 and the AF driver 335-2. The AF driver 335-2 may include an AF Hall sensor. As used herein, the Hall sensor may be a type of sensor which detects the presence and magnitude of a magnetic field using the Hall effect.

According to an embodiment, the AF coil 330 may be coupled to the lower portion of the AF FPCB and AF driver 335, and the AF upper carrier 340 may be coupled to the upper portion of the AF FPCB and AF driver 335. The AF coil 330 may be coupled to the AF FPCB and AF driver 335, the AF lower carrier 325, and the AF upper carrier 340 to move together.

According to an embodiment, a space in which at least the OIS carrier 345 can be accommodated may be defined by the AF coil 330, the AF lower carrier 325, and the AF upper carrier 340. For example, in the space defined by the AF coil 330, the AF lower carrier 325, and the AF upper carrier 340, the OIS carrier 345 and the lens assembly 360 may move in a direction (e.g., x direction or y direction) substantially perpendicular to the optical axis.

According to an embodiment, the lens assembly 360 may be disposed on the OIS carrier 345. The lens assembly 360 may be coupled to the OIS carrier 345 to move together with the OIS carrier 345.

According to an embodiment, the OIS coil and OIS driver 346 may be disposed on the outer side surfaces of the OIS carrier 345. The OIS coil and OIS driver 346 may include an OIS coil 346-1 and an OIS driver 346-2. The OIS coil and OIS driver 346 may be disposed on the outer side surfaces of the OIS carrier 345 to face the plurality of magnets 315. For example, the OIS coil and OIS driver 346 may be disposed along the outer side surfaces of the OIS carrier 345, and the OIS coil and OIS driver 346 may be located at a position corresponding to the positions of the plurality of magnets 315.

According to an embodiment, in the following description, the OIS coil and OIS driver 346 will be described separately as the OIS coil 346-1 and the OIS driver 346-2 with reference to FIGS. 4, 5, 6, and 7. The OIS driver 346-2 may include an OIS Hall sensor.

According to an embodiment, an upper spring 350 may be coupled to the upper portion of the AF upper carrier 340. For example, the upper spring 350 may include an AF upper spring 350-1 and an OIS upper spring 350-2.

According to an embodiment, a cover part 353 may be disposed on the upper spring 350, and the cover part 353 may be coupled to a shield can 355. The shield can 355 may define at least a portion of the upper exterior of the camera module 180.

According to an embodiment, the shield can 355 may include an opening corresponding to the lens assembly 360. For example, a hole through which at least a portion of the lens assembly 360 can be seen from the outside may be provided in the center of the shield can 355.

Figure 4:
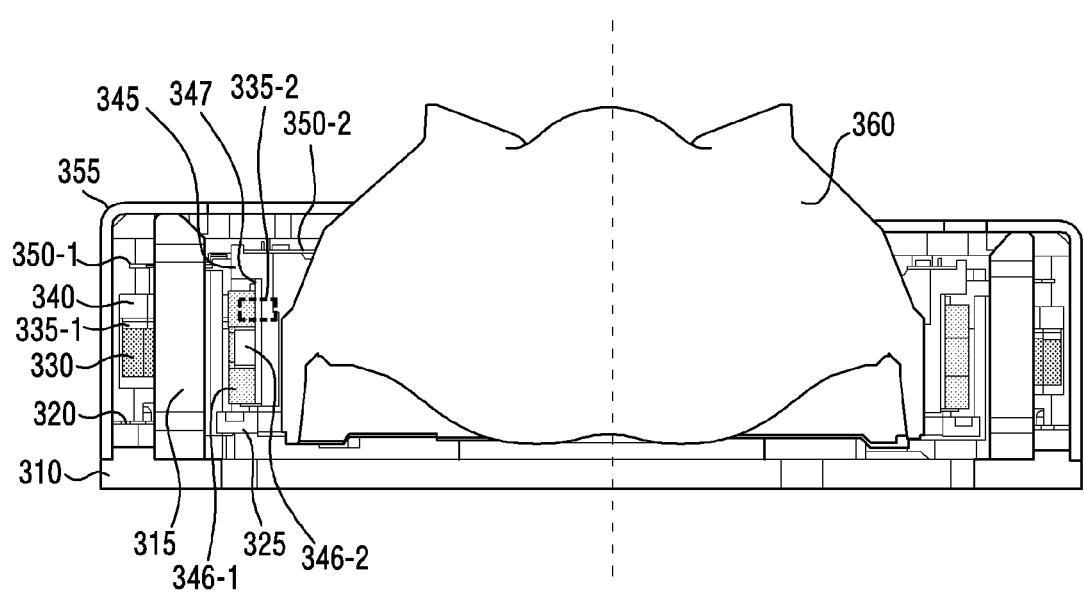
FIG. 4 is a view illustrating a cross section of a stack structure of the camera module according to an embodiment.

FIG. 4 is a view illustrating a cross section of a stack structure of the camera module according to an embodiment.

According to an embodiment, the base 310 may define at least a portion of the lower exterior of the camera module 180. According to an embodiment, the shield can 355 may define at least a portion of the upper exterior of the camera module 180. A hole having a size corresponding to the size of the lens included in the lens assembly 360 may be provided in the center of the shield can 355.

According to an embodiment, the base 310 may support the plurality of magnets 315, the AF lower spring 320, and the AF lower carrier 325 in the lower portion.

According to an embodiment, the camera module 180 may include an AF spring (e.g., AF upper spring 350-1, AF lower spring 320) that restricts a movement of the AF upper carrier 340 and the AF lower carrier 325 along the optical axis. That is, the AF spring may allow a movement of the AF upper carrier 340 and the AF lower carrier 325 along the optical axis in a limited range. The processor 120 may control the first current applied to the AF coil 330 via the AF spring. The AF spring may include an AF lower spring 320 disposed at the lower end of the AF lower carrier 325, and an AF upper spring 350-1 disposed at the upper end of the AF upper carrier 340.

According to an embodiment, the AF lower spring 320 may physically adjust a movement distance of the AF lower carrier 325 according to the movement of the AF lower carrier 325. According to an embodiment, the AF lower spring 320 may transmit power and/or a control signal to the AF coil 330 by being connected to a terminal of the base 310.

According to an embodiment, the AF upper spring 350-1 may have a size and/or a shape corresponding to the AF lower spring 320. The AF upper spring 350-1 may physically adjust the movement distance of the AF upper carrier 340 according to the movement of the AF upper carrier 340 and/or the lens assembly 360. According to an embodiment, the AF upper spring 350-1 may transmit power and/or a control signal to the AF coil 330 and the AF driver 335-2, respectively, via the AF FPCB 335-1.

Figure 7:
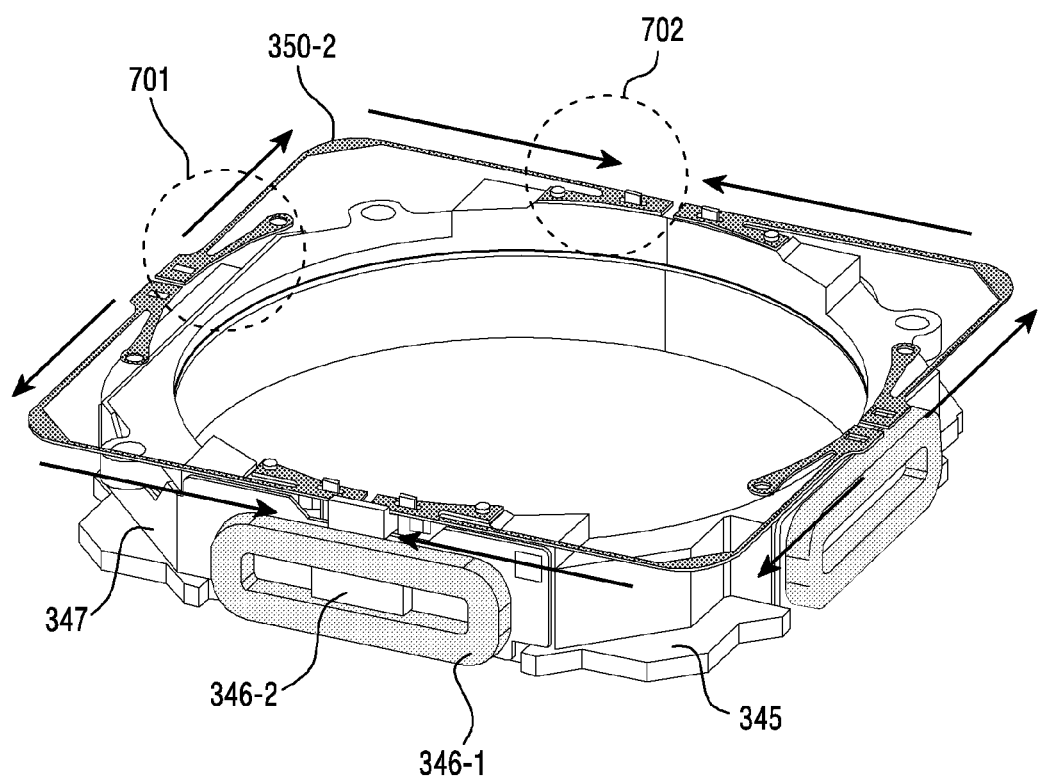
FIG. 7 is a view illustrating a control structure based on OIS coils of a camera module according to an embodiment.

According to an embodiment, the camera module 180 may include an OIS spring that restricts a movement of the OIS carrier 345 in a direction perpendicular to the optical axis (See FIG. 7). The OIS spring may include an OIS upper spring 350-2 disposed at the upper end of the AF upper carrier 340.

According to an embodiment, the OIS upper spring 350-2 may have a size corresponding to or greater than the diameter of the lens assembly 360. According to an embodiment, the OIS upper spring 350-2 may physically adjust the movement distance of the OIS carrier 345 according to the movement of the lens assembly 360 in a direction (e.g., x direction, y direction) substantially perpendicular to the optical axis. According to an embodiment, the OIS upper spring 350-2 may transmit power and/or a control signal to the OIS coil 346-1 and the OIS driver 346-2, respectively, via the OIS FPCB 347.

According to an embodiment, an OIS FPCB 347 may be coupled to the side of the OIS carrier 345. The OIS FPCB 347 may be disposed to surround at least some of the outer side surfaces of the OIS carrier 345.

According to an embodiment, the OIS coil 346-1 and the OIS driver 346-2 may be coupled on the OIS FPCB 347. The OIS driver 346-2 may be disposed to be surrounded by the OIS coil 346-1. For example, the OIS driver 346-2 may be coupled to a position corresponding to the center of the OIS coil 346-1.

According to an embodiment, the OIS driver 346-2 may detect the positions of the OIS carrier 345 and the lens assembly 360. The OIS driver 346-2 may include an OIS Hall sensor, and the OIS Hall sensor may output Hall effect data according to magnetic fields with the plurality of magnets 315. Accordingly, the OIS driver 346-2 may detect a relative position with respect to the plurality of magnets 315 on a plane perpendicular to the optical axis, based on a result value of the OIS Hall sensor.

According to an embodiment, the AF coil 330 and the OIS coil 346-1 may be disposed at a position corresponding to the positions of the plurality of magnets 315 on the OIS FPCB 347. For example, the AF coil 330 and the OIS coil 346-1 may be disposed at a position facing the plurality of magnets 315 on the OIS FPCB 347. For example, the AF coil 330 and the OIS coil 346-1 may be disposed at the same height as the plurality of magnets 315 in the optical axis like FIG. 5.

According to an embodiment, the OIS carrier 345 may be seated on the AF lower carrier 325 in the space defined by the AF coil 330, the AF lower carrier 325, and the AF upper carrier 340.

According to an embodiment, the AF lower carrier 325 may be coupled to the lower portion of the AF coil 330, and the AF upper carrier 340 may be coupled to the upper portion of the AF coil 330. For example, the AF coil 330 may be supported at its lower portion and its upper portion by the AF lower carrier 325 and the AF upper carrier 340, respectively.

According to an embodiment, the AF coil 330 and the OIS coil 346-1 may move in the optical axis direction in a mutually dependent manner. For example, as the AF coil 330 moves in the optical axis direction, the AF lower carrier 325 and the AF upper carrier 340 may also move in the optical axis direction. Following the movement of the AF lower carrier 325 and the AF upper carrier 340 in the optical axis direction, the OIS carrier 345 seated on the AF lower carrier 325 may also move in the optical axis direction.

According to an embodiment, the lens assembly 360 may be disposed on the OIS carrier 345. According to an embodiment, the lens assembly 360 may move depending on the movement of the OIS carrier 345.

According to an embodiment, the AF FPCB 335-1 and the AF driver 335-2 may be coupled to the lower portion of the AF upper carrier 340. For example, the AF FPCB 335-1 may be coupled to the lower surface of the AF upper carrier 340. The AF driver 335-2 may be coupled on the AF FPCB 335-1.

According to an embodiment, the AF driver 335-2 may detect the position of the AF carriers (e.g., the AF upper carrier 340 and the AF lower carrier 325). The AF driver 335-2 may include an AF Hall sensor, and the AF Hall sensor may output Hall effect data according to magnetic fields with the plurality of magnets 315. The AF Hall sensor may detect magnetic fields in the optical axis direction (e.g., z axis) with respect to the plurality of magnets 315, and the AF driver 335-2 may acquire position information of the lens assembly 360 in the optical axis direction based on the result value of the AF Hall sensor.

According to an embodiment, the AF coil 330 may be coupled on the AF FPCB 335-1.

According to an embodiment, since the AF coil 330 is connected to the AF upper carrier 340 via the AF FPCB 335-1, the movement of the AF upper carrier 340 may depend on the movement of the AF coil 330.

FIG. 5 is a view illustrating a disposition relationship of an AF coil, a plurality of magnets, and a plurality of OIS coils of a camera module according to an embodiment.

Referring to FIG. 5, in an embodiment, in order to describe the disposition relationship of the AF coil 330, the plurality of magnets 315, and the plurality of OIS coils 346-1, the components other than the AF coil 330, the plurality of magnets 315, and the plurality of OIS coils 346-1, are omitted.

According to an embodiment, the AF coil 330, the plurality of magnets 315, and the plurality of OIS coils 346-1 may be disposed at positions corresponding to each other. For example, the plurality of magnets 315 may be fixedly disposed on the base 310. The AF coil 330 may be disposed outside the plurality of magnets 315 fixedly disposed on the base 310 to surround the plurality of magnets 315. The OIS coils 346-1 may be disposed inside the plurality of magnets 315 at positions facing the plurality of magnets 315.

According to an embodiment, the number of the illustrated plurality of magnets 315 is an example, and there may be no particular limitation on the number. For example, in FIG. 5, the plurality of magnets 315 are illustrated as being composed of four magnets surrounding the lens assembly 360 in all directions (+x, +y, −x, and −y directions), but the plurality of magnets 315 may be composed of two magnets that are perpendicular to each other with respect to the lens assembly 360, and various other embodiments that may be implemented by a person ordinarily skilled in the art are possible.

According to an embodiment, the OIS coils 346-1 may be disposed in a number corresponding to the number of the plurality of magnets 315.

According to an embodiment, the OIS coils 346-1 may move depending on the movement of the AF coil 330. The movement of the OIS carrier 345 may be dependent on the movement of an AF carrier (e.g., the AF upper carrier 340 and the AF lower carrier 325). For example, the processor 120 may control a first current applied to the AF coil 330 to move the AF carrier in the optical axis direction based on the magnetic force generated between the AF coil 330 and the plurality of magnets 315 so as to perform an AF function. When the AF carrier is moved in the optical axis direction, the OIS carrier 345 disposed on the AF lower carrier 325 may be moved together in the optical axis direction (e.g., z axis). For example, when the AF coil 330 is moved in the optical axis direction (illustrated by arrows M in FIG. 5) by the magnetic force of the plurality of magnets 315, the AF upper carrier 340, the AF lower carrier 325, the OIS carrier 345, and the OIS coils 346-1 may be moved together in the optical axis direction.

According to an embodiment, the OIS coils 346-1 may move independently from the movement of the AF coil 330. Within the space defined by the AF upper carrier 340, the AF coil 330, and the AF lower carrier 325, the OIS carrier 345 may move on a plane (i.e., plan defined by x direction and y direction) substantially perpendicular to the optical axis regardless of the movement of the AF coil 330. For example, the processor 120 may control a second current applied to the OIS coils 346-1 to move the OIS carrier 345 in a direction perpendicular to the optical axis direction based on the magnetic force generated between the OIS coils 346-1 and the plurality of magnets 315 so as to perform an OIS function. The OIS carrier 345 may be moved in a plane substantially perpendicular to the optical axis within a space defined inside the AF carrier.

According to an embodiment, when the processor 120 controls the first current applied to the AF coil 330, a set of the AF coil 330, the AF upper carrier 340, the AF lower carrier 325, the OIS carrier 345, the OIS coils 346-1, and the lens assembly 360 may be moved along the optical axis by the magnetic force between the AF coil 330 and the plurality of magnets 315. In addition, when the processor 120 controls the second current applied to the OIS coils 346-1, a set of the OIS carrier 345, the OIS coils 346-1, and the lens assembly 360 may be moved in a plane substantially perpendicular to the optical axis.

Figure 6:
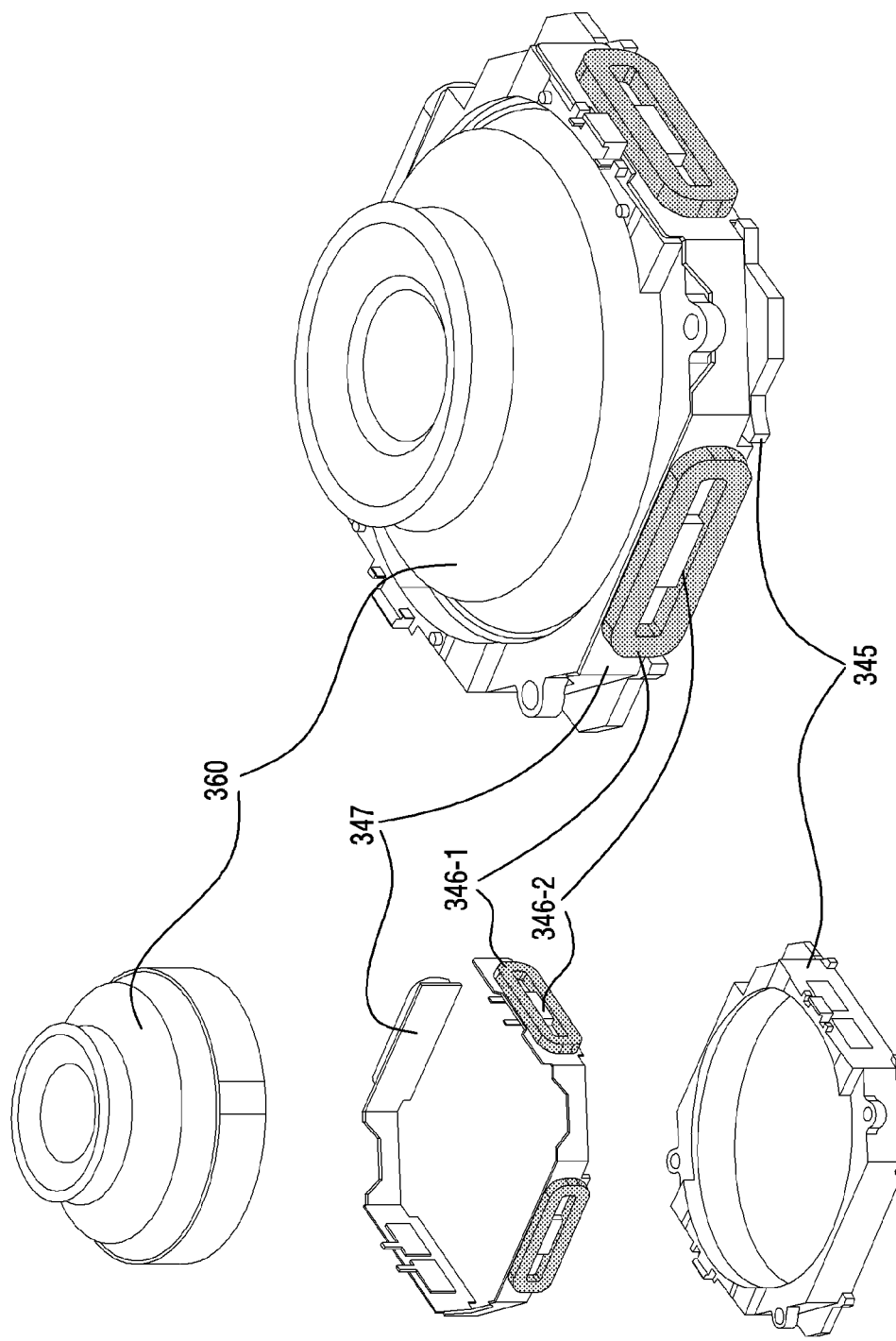
FIG. 6 is a view illustrating a disposition relationship of a lens assembly, OIS coils, OIS drivers, and an OIS carrier of a camera module according to an embodiment.

FIG. 6 is a view illustrating a disposition relationship of a lens assembly, OIS coils, OIS drivers, and an OIS carrier of a camera module according to an embodiment.

In an embodiment, referring to FIG. 6, in order to describe the disposition relationship of the lens assembly 360, the OIS coils 346-1, the OIS drivers 346-2, and the OIS carrier 345, components other than the lens assembly 360, the OIS coils 346-1, the OIS drivers 346-2, and the OIS carriers 345 are omitted.

According to an embodiment, the OIS FPCB 347 may be coupled to the outer surface of the OIS carrier 345. The OIS FPCB 347 may be in a form of at least partially surrounding the outer surface of the OIS carrier 345. For example, the OIS FPCB 347 may be disposed to surround at least some of the outer side surfaces of the OIS carrier 345 that are parallel to the optical axis. That is, the OIS FPCB 347 may be disposed to surround at least a portion of the outer side surfaces of the OIS carrier 345 that are oriented in directions (e.g., the +x-direction, the +y-direction, the −x direction, the −y direction) perpendicular to the optical axis (e.g., the z-axis).

According to an embodiment, the OIS coils 346-1 and the OIS drivers 346-2 may be disposed outside the OIS carrier 345. For example, the OIS coils 346-1 may be disposed on the OIS FPCB 347 coupled to the outer surfaces of the OIS carrier 345. For example, the OIS coils 346-1 may be disposed on the OIS FPCB 347 symmetrically about the optical axis. For example, the OIS coils 346-1 may be disposed on the OIS FPCB 347 in the +x direction, the +y direction, the −x direction, and the −y direction from the optical axis (e.g., the z axis).

According to an embodiment, the OIS drivers 346-2 may be disposed on the OIS FPCB 347. The OIS drivers 346-2 may be disposed on the OIS FPCB 347 to be surrounded by the OIS coils 346-1, respectively. For example, the OIS drivers 346-2 may be disposed on the OIS FPCB 347 at positions corresponding to the centers of the OIS coils 346-1. According to an embodiment, the OIS drivers 346-2 may acquire position information of the OIS carrier 345 based on the magnetic fields of the plurality of magnets 315. The OIS driver 346-2 may acquire information on the positions of the OIS carrier 345 and the lens assembly 360 on a plane (i.e., plan defined by x direction and y direction) substantially perpendicular to the optical axis.

According to an embodiment, the OIS carrier 345 may define a hole-shaped space for accommodating the lens assembly 360. According to an embodiment, the lens assembly 360 may be disposed in the space defined by the OIS carrier 345. For example, the lens assembly 360 may be accommodated in the space in the OIS carrier 345, and may be seated on the OIS carrier 345 by being accommodated therein. The lens assembly 360 may be seated in the space defined by the OIS carrier 345 to move together with the OIS carrier 345.

FIG. 7 is a view illustrating a control structure based on OIS coils of a camera module according to an embodiment.

According to an embodiment, an OIS FPCB 347 may be coupled to the side surfaces of the OIS carrier 345. According to an embodiment, OIS coils 346-1 and OIS drivers 346-2 may be coupled on the OIS FPCB 347.

According to an embodiment, an OIS upper spring 350-2 may be disposed on the OIS carrier 345. For example, the OIS upper spring 350-2 may be disposed on the AF upper carrier 340, and the OIS carrier 345 may be located under the OIS upper spring 350-2.

According to an embodiment, the OIS upper spring 350-2 may include a first portion 701 and a second portion 702. The first portion 701 may be electrically and/or physically coupled to the AF upper carrier 340, and the second portion 702 may be electrically and/or physically coupled to the OIS carrier 345.

According to an embodiment, the AF upper carrier 340 may acquire power and/or a control signal from the outside of the camera module 180 via the base 310 and the AF upper spring 350-1. This will be described later with reference to FIGS. 13 to 15. According to an embodiment, the AF upper carrier 340 may transmit the power and/or the control signal received from the outside of the camera module 180 to the OIS FPCB 347 via the first portion 701 of the OIS upper spring 350-2. For example, the OIS upper spring 350-2 may receive the power and/or the control signal from the AF upper carrier 340 via the first portion 701 and may transmit the power and/or the control signal to the OIS FPCB 347 via the second portion 702. The arrows in FIG. 7 show the flow direction of the power and/or the control signal received from the AF upper carrier 340.

According to an embodiment, the OIS FPCB 347 may provide the power and/or the control signal received via the OIS upper spring 350-2 to the OIS coil 346-1 and/or the OIS driver 346-2, respectively. Accordingly, the processor 120 may control a second current applied to the OIS coil 346-1 via the base 310, the AF upper spring 350-1, the AF upper carrier 340, the OIS upper spring 350-2, and the OIS FPCB 347, or may detect the position of the lens assembly 360 by using the OIS driver 346-2.

According to an embodiment, rotation of the OIS carrier 345 with respect to the optical axis may be suppressed by the OIS upper spring 350-2. Since the first portion 701 of the OIS upper spring 350-2 is physically coupled to the AF upper carrier 340, the OIS carrier 345 may move in a direction (e.g., the x axis or the y axis) perpendicular to the optical axis (e.g., the z axis) without rotating about the optical axis.

Figure 8:
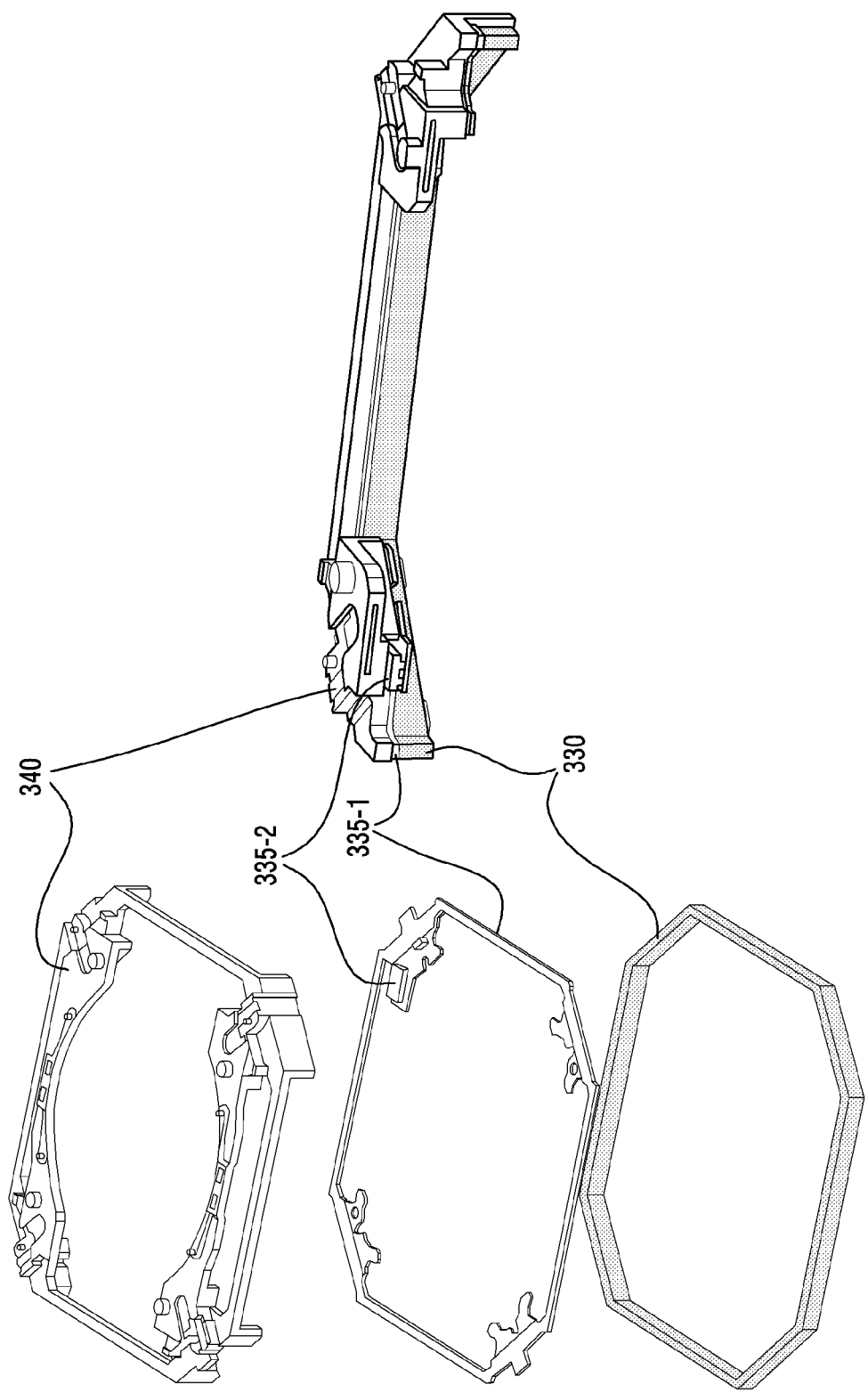
FIG. 8 is a view illustrating a control structure based on an AF coil of a camera module according to an embodiment.

FIG. 8 is a view illustrating a control structure based on an AF coil of a camera module according to an embodiment.

In an embodiment, referring to FIG. 8, components other than the AF coil 330, the AF FPCB 335-1, the AF driver 335-2, and the AF upper carrier 340 may be omitted for convenience of description.

According to an embodiment, the AF FPCB 335-1 may be coupled on the AF coil 330, and the AF driver 335-2 may be disposed on the AF FPCB 335-1.

According to an embodiment, the AF upper carrier 340 may be disposed on the AF FPCB 335-1 and the AF driver 335-2.

According to an embodiment, the AF upper carrier 340 may acquire power and/or a control signal from the outside of the camera module 180 via the base 310 and the AF upper spring 350-1. This will be described later with reference to FIGS. 13 to 15. According to an embodiment, the AF upper carrier 340 may transmit the power and/or the control signal received from the outside of the camera module 180 to the AF FPCB 335-1. According to an embodiment, the AF FPCB 335-1 may transmit the power and/or the control signal received from the AF upper carrier 340 to the AF driver 335-2.

According to an embodiment, the AF FPCB 335-1 may provide the power and/or the control signal received via the AF upper carrier 340 to the AF coil 330 and/or the AF driver 335-2, respectively. Accordingly, the processor 120 may control a first current applied to the AF coil 330 via the base 310, the AF upper spring 350-1, the AF upper carrier 340, and the AF FPCB 335-1, or may detect the position of the lens assembly 360 in the optical axis direction by using the AF driver 335-2.

Figure 9:
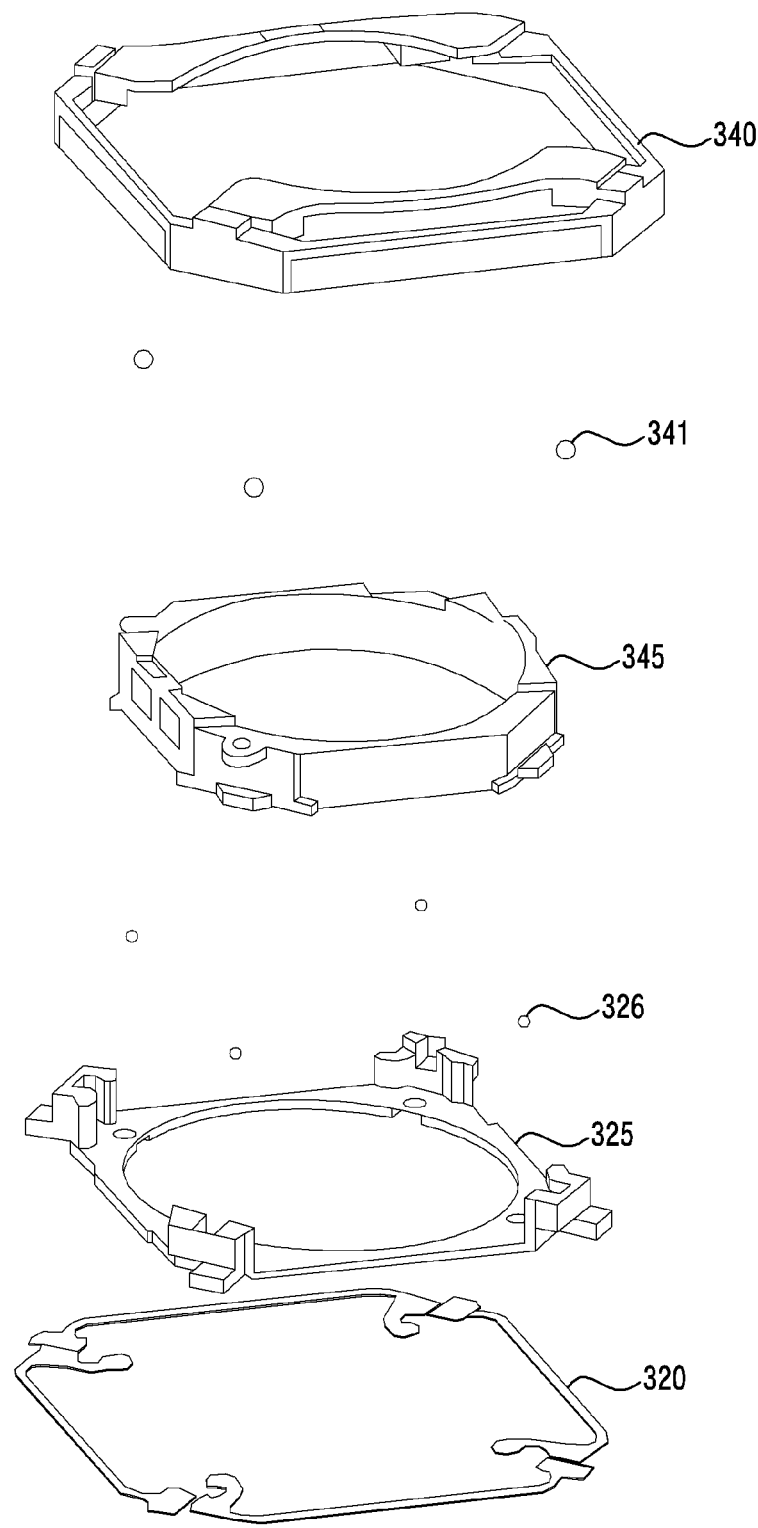
FIG. 9 is a view illustrating the disposition of balls in a camera module according to an embodiment.
Figure 10:
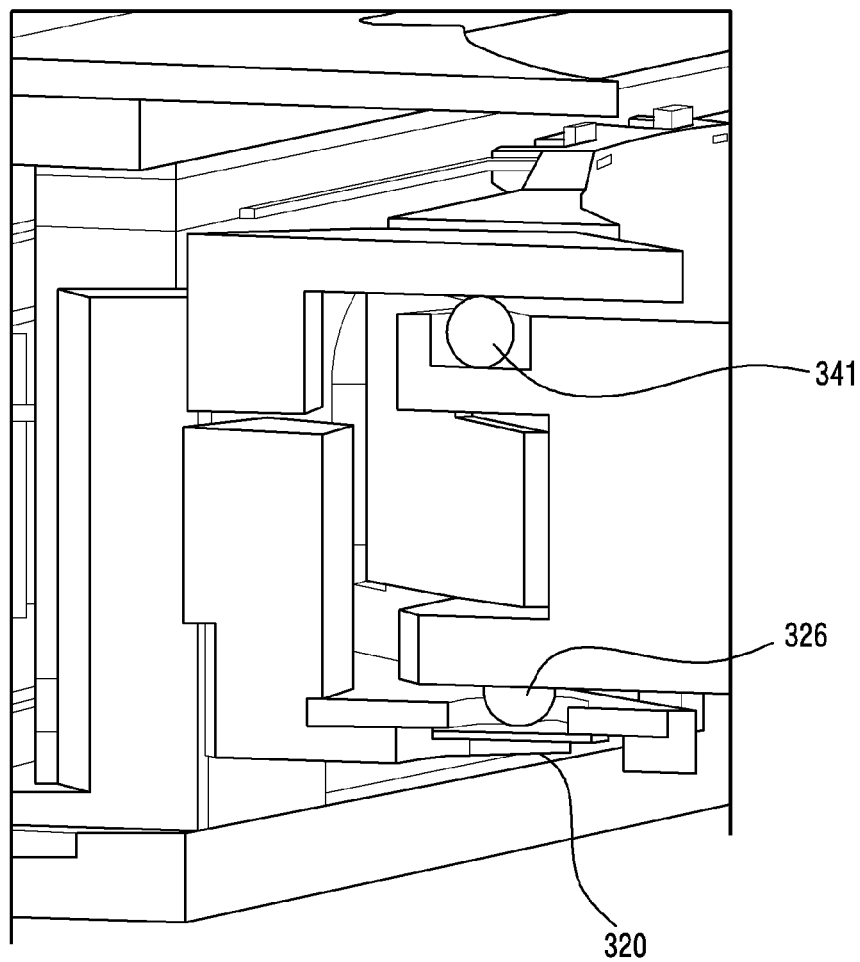
FIG. 10 is a view illustrating the disposition of balls in a camera module according to an embodiment.
Figure 11:
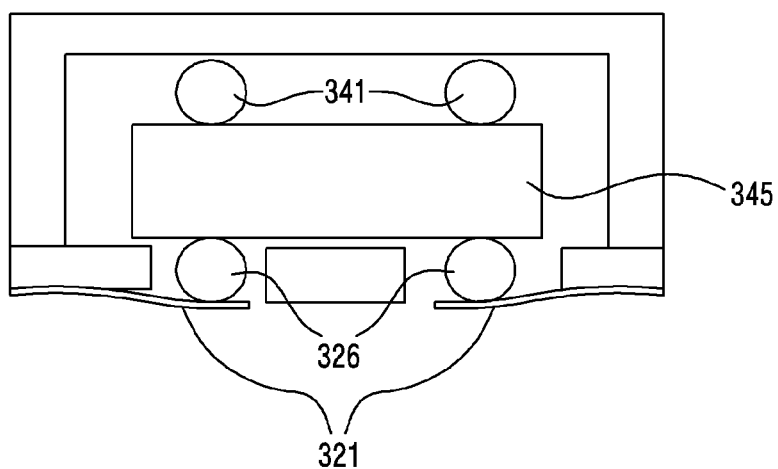
FIG. 11 is a view illustrating a disposition structure of an AF lower spring according to an embodiment.
Figure 11:
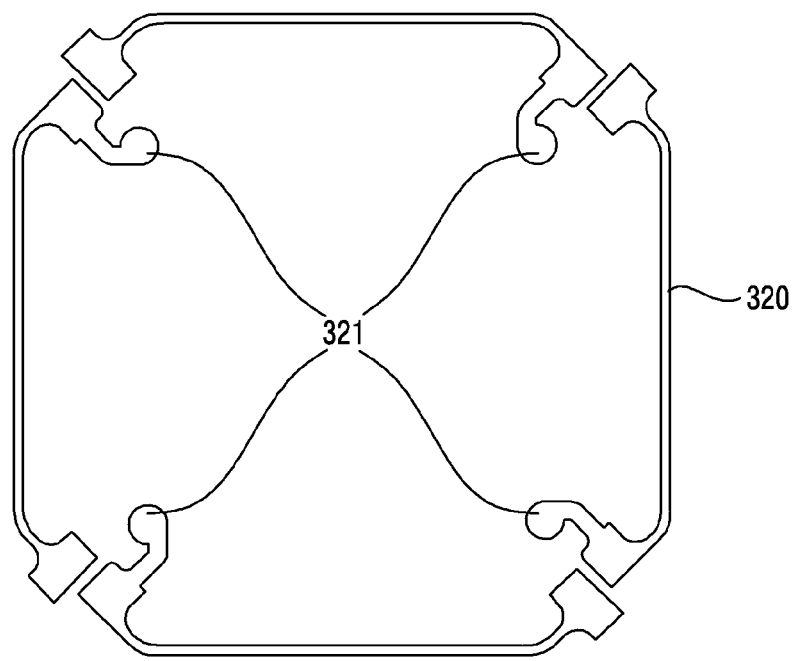

FIG. 9 is a view illustrating the disposition of balls in a camera module according to an embodiment, and FIG. 10 is a view illustrating the disposition of balls in a camera module according to an embodiment. FIG. 11 is a view illustrating a disposition structure of an AF lower spring according to an embodiment. FIG. 11 includes a figure schematically illustrating the structures of an OIS carrier 345, first OIS balls 326, second OIS balls 341, and a ball spring 321.

According to an embodiment, an AF lower carrier 325 may be disposed on an AF lower spring 320. According to an embodiment, the OIS carrier 345 may be disposed on the AF lower carrier 325. According to an embodiment, an AF upper carrier 340 may be disposed on the OIS carrier 345.

In an embodiment, referring to FIG. 9, a plurality of first OIS balls 326 may be disposed between the AF lower carrier 325 and the OIS carrier 345. According to an embodiment, the AF lower carrier 325 may be provided with grooves in which the first OIS balls 326 are disposed, respectively. For example, the AF lower carrier 325 may be provided with grooves capable of partially accommodating the first OIS balls 326, respectively.

According to an embodiment, a plurality of second OIS balls 341 may be disposed between the OIS carrier 345 and the AF upper carrier 340. According to an embodiment, the AF upper carrier 340 may be provided with grooves in which the second OIS balls 341 are disposed, respectively. For example, the AF upper carrier 340 may be provided with grooves capable of partially accommodating the second OIS balls 341, respectively.

According to an embodiment, the OIS carrier 345 may be provided with grooves for disposing the first OIS balls 326 and the second OIS balls 341 therein at positions corresponding to the positions of the first OIS balls 326 and the second OIS balls 341. For example, grooves for partially accommodating the first OIS balls 326 may be provided on the lower surface of the OIS carrier 345, and grooves for partially accommodating the second OIS balls 341 may be provided on the upper surface of the OIS carrier 345.

According to an embodiment, the number of first OIS balls 326 and second OIS balls 341 may not be particularly limited according to a design. For example, the camera module 180 may include four first OIS balls 326 and three second OIS balls 341.

In an embodiment, referring to FIG. 10, the first OIS balls 326 and the seconds OIS ball 341 may be disposed in the grooves, which are provided on the lower surface, and the grooves, which are provided in the upper surface of the OIS carrier 345, respectively.

According to an embodiment, between the AF lower carrier 325 and the OIS carrier 345, the first OIS balls 326 may participate in the movement of the OIS carrier 345.

According to an embodiment, between the OIS carrier 345 and the AF upper carrier 340, the second OIS balls 341 may participate in the movement of the OIS carrier 345.

Referring to FIG. 11, ball springs 321 may be provided at the corner portions of the AF lower spring 320. For example, inwardly directed ball springs 321 may be provided at the corner portions of the AF lower spring 320. The ball springs 321 may be provided at positions corresponding to the positions of the first OIS balls 326.

According to an embodiment, the ball springs 321 may prevent the OIS carrier 345 from being separated in the optical axis direction by physically supporting the first OIS balls 326. For example, the ball springs 321 may restrict the movement of the OIS carrier 345 in a direction substantially perpendicular to the optical axis (e.g., x-axis or y-axis) by supporting the first OIS balls 326.

According to an embodiment, the ball springs 321 may be formed integrally (i.e., monolithic) with the AF lower spring 320. According to an embodiment, the ball springs 321 and the AF lower spring 320 may be manufactured independently from each other, and may be integrated by being coupled to each other.

Figure 12:
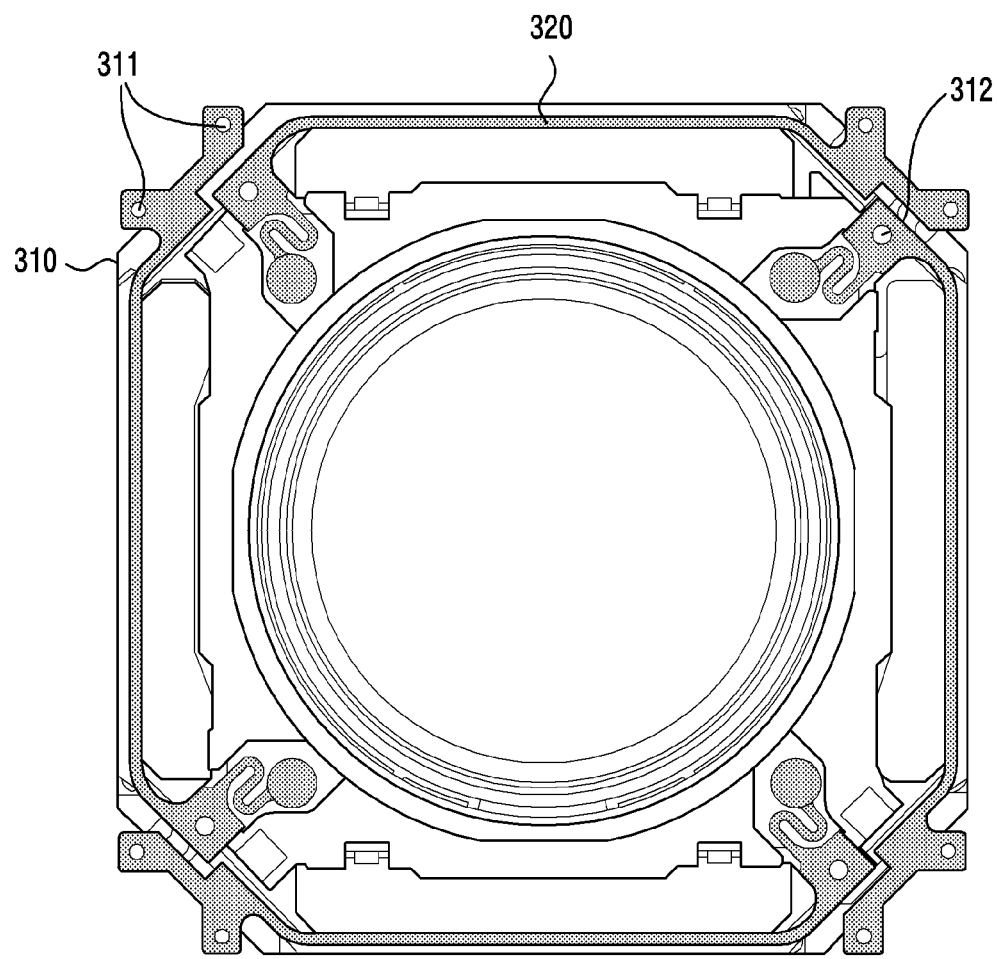
FIG. 12 is a view illustrating a disposition structure of a base and an AF lower spring according to an embodiment.

FIG. 12 is a diagram illustrating a disposition structure of a coupling portion between the base 310 and the AF lower spring 320 according to an embodiment.

According to an embodiment, the base 310 may be coupled to the AF lower spring 320. For example, first connection holes 311 for connection to the base 310 may be provided in the corner portions of the AF lower spring 320. The base 310 and the AF lower spring 320 may be coupled via the first connection holes 311.

According to an embodiment, second connection holes 312 may be provided in peripheral regions of the ball springs 321 of the AF lower spring 320. According to an embodiment, the AF lower spring 320 and the AF lower carrier 325 may be coupled via the second connection holes 312.

According to an embodiment, the AF lower spring 320 may be coupled to the base 310 and the AF lower carrier 325 so that the AF carrier (e.g., the AF upper carrier 340, the AF coil 330, and the AF lower carrier 325) may be disposed to move in the optical axis direction. The AF carrier may not move in a direction not parallel to the optical axis by the physical support of the AF lower spring 320.

Figure 13:
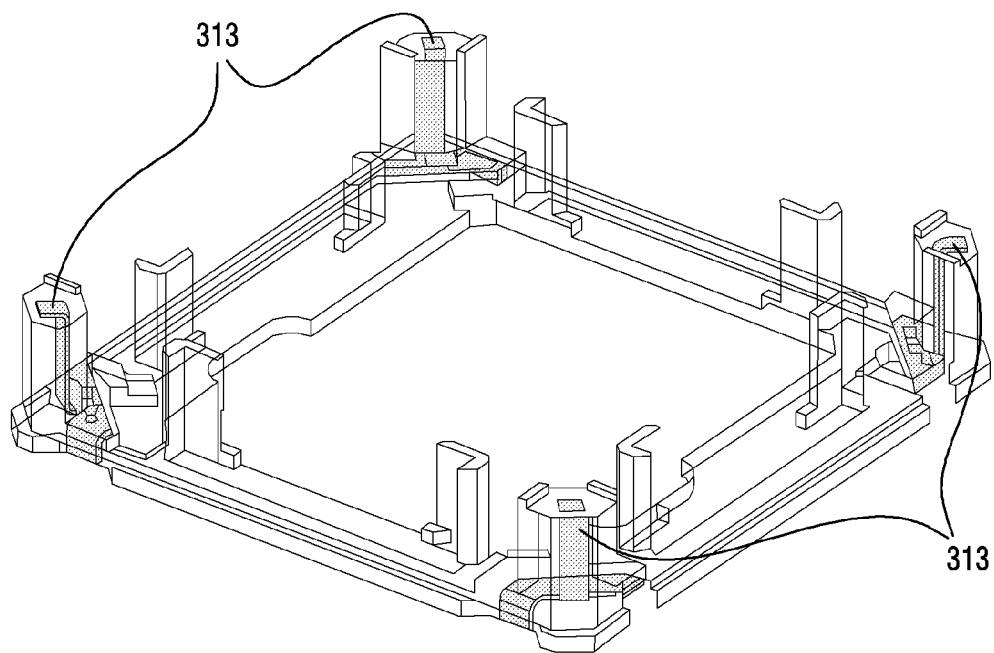
FIG. 13 is a view illustrating a disposition structure of connection portions of a base according to an embodiment.

FIG. 13 is a view illustrating a disposition structure of connection portions of the base according to an embodiment.

According to an embodiment, the base 310 may include connection portions 313. For example, the connection portions 313 may be provided at the corner portions of the base 310. A metal terminal may be inserted into each connection portion 313.

According to an embodiment, since the connection portions 313 each include a metal terminal, external power and/or a control signal of the camera module (e.g., the camera module 180) may be transmitted to the inside of the camera module (e.g., the camera module 180) through the metal terminal. According to an embodiment, by being electrically connected to the processor 120 of the electronic device 101, the connection portions 313 of the base 310 may at least transmit/receive power and/or a control signal. For example, the processor 120 may control a current applied to at least one of the AF coil 330 and the OIS coils 346-1 via the connection portion 313 of the base 310 or may control at least one of the AF driver 335-2 or the OIS driver 346-2.

According to an embodiment, the external power and/or the control signal received via the connection portions 313 may be transmitted to the AF upper carrier 340 via the AF upper spring 350-1. The AF upper carrier 340 may transmit the power and/or the control signal received via the AF upper spring 350-1 to the OIS upper spring 350-2.

Figure 14:
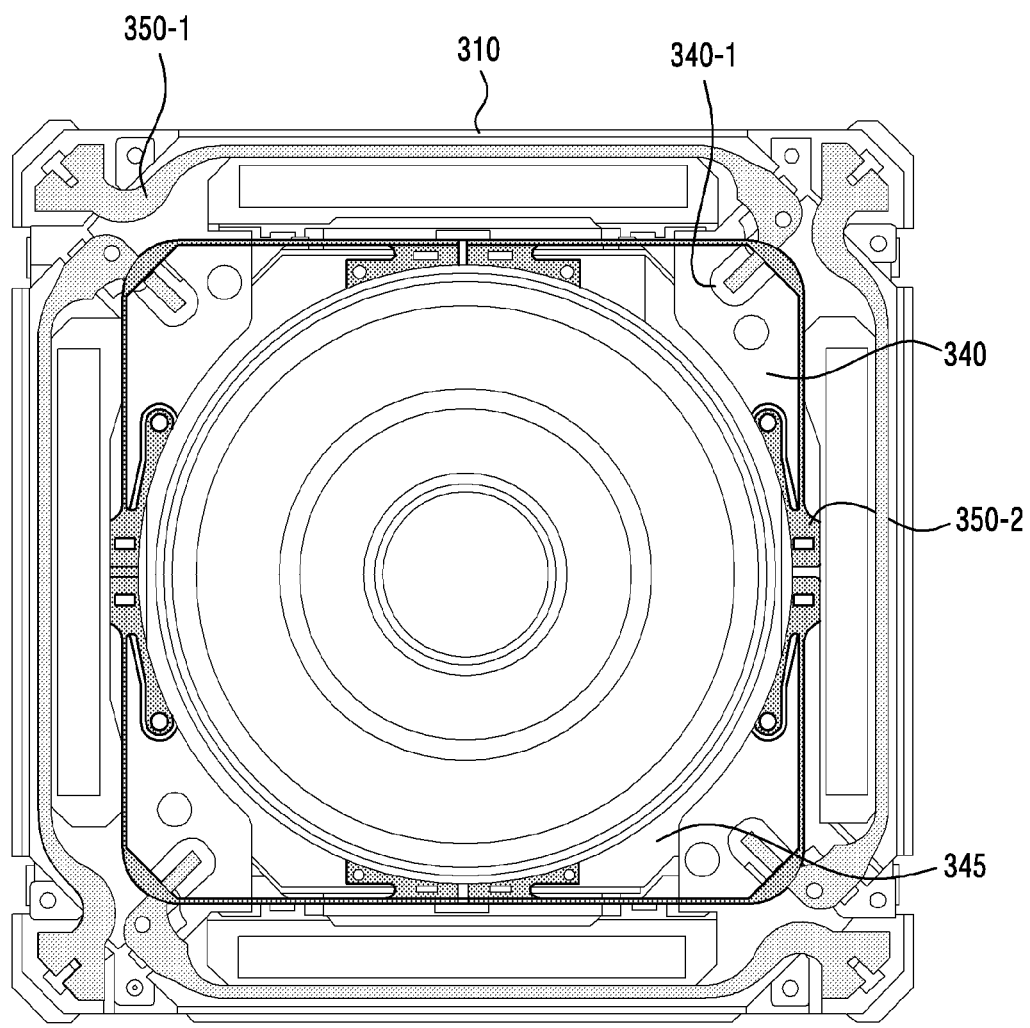
FIG. 14 is a view illustrating a disposition structure of an upper spring according to an embodiment.
Figure 15:
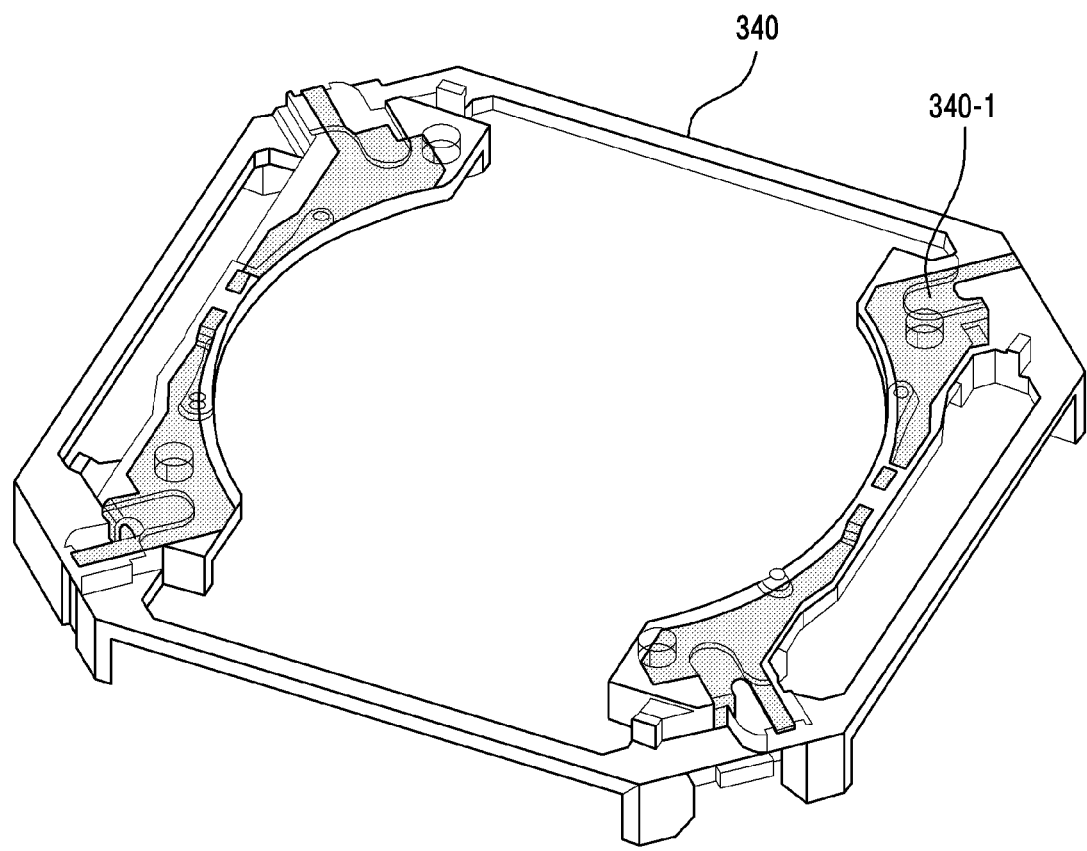
FIG. 15 is a view illustrating metal portions included in an upper AF carrier according to an embodiment.

FIG. 14 is a view illustrating a disposition structure of the upper spring according to an embodiment. FIG. 15 is a view illustrating metal portions included in the upper AF carrier according to an embodiment.

According to an embodiment, the upper spring 350 may include an AF upper spring 350-1 and an OIS upper spring 350-2.

According to an embodiment, the AF upper spring 350-1 may be fixed by being coupled to the base 310. According to an embodiment, the AF upper spring 350-1 may be fixed by being coupled to the AF upper carrier 340.

According to an embodiment, the AF upper carrier 340 may include metal portions 340-1. The AF upper spring 350-1 may transmit power and/or a control signal received from the outside of the camera module 180 to the AF upper carrier 340 via the metal portions 340-1 included in the AF upper carrier 340.

According to an embodiment, the metal portions 340-1 included in the AF upper carrier 340 may apply the power and/or the control signal received from the AF upper spring 350-1 to the OIS upper spring 350-2. For example, the metal portions 340-1 may transmit and receive the power and/or the control signal by electrically interconnecting the AF upper spring 350-1 and the OIS upper spring 350-2.

A camera module according to an embodiment may include: a base defining at least a portion of a lower exterior of the camera module; a plurality of magnets disposed on the base about an optical axis of the camera module; an auto focus (AF) coil disposed to surround the plurality of magnets while being spaced apart from the plurality of magnets by a predetermined distance; an AF carrier coupled to the AF coil and movable along the optical axis together with the AF coil; an optical image stabilization (OIS) carrier disposed to be movable in a direction perpendicular to the optical axis within a space defined by the AF coil and the AF carrier; a plurality of OIS coils coupled to an external portion of the OIS carrier to face the plurality of magnets; and a lens assembly disposed on the OIS carrier.

In the camera module according to an embodiment, the plurality of magnets may include at least two magnets disposed perpendicular to each other.

The camera module according to an embodiment may further include a first AF spring and an OIS spring, which are disposed on the AF carrier, and a second AF spring disposed between the AF carrier and the base.

In the camera module according to an embodiment, the first AF spring and the second AF spring may be configured to restrict a movement of the lens assembly along the optical axis, and the OIS spring may be configured to restrict a movement of the lens assembly in a direction perpendicular to the optical axis.

The camera module according to an embodiment may be configured to: control a first current applied to the AF coil based on a first control signal received through the first AF spring; and perform an AF function based on a magnetic force generated between the AF coil and the plurality of magnets when the first current is applied to the AF coil.

The camera module according to an embodiment may be configured to: control a second current applied to the plurality of OIS coils based on a second control signal received through the first AF spring and the OIS spring; and perform an OIS function based on a magnetic force generated between the plurality of OIS coils and the plurality of magnets when the second current is applied to the plurality of OIS coils.

In the camera module according to an embodiment, the AF carrier may include a first AF carrier coupled to an upper portion of the AF coil, and a second AF carrier coupled to a lower portion of the AF coil, wherein first OIS balls may be disposed between the OIS carrier and the first AF carrier, and second OIS balls may be disposed between the OIS carrier and the second AF carrier.

In the camera module according to an embodiment, an AF flexible printed circuit board (FPCB) may be disposed between the AF coil and the AF carrier, and an AF driver may be disposed on the AF FPCB.

In the camera module according to an embodiment, the AF driver may include an AF Hall sensor, and the camera module may be configured to detect a position of the lens assembly along the optical axis by using the AF Hall sensor.

The camera module according to an embodiment may further include an OIS FPCB coupled to the OIS carrier in a form of at least partially surrounding a side surface of the OIS carrier, wherein the plurality of OIS coils and the OIS drivers may be disposed on the OIS FPCB.

In the camera module according to an embodiment, each of the OIS drivers may include an OIS Hall sensor, and the camera module may be configured to detect a position of the lens assembly on a plane (i.e., plan defined by x direction and y direction) perpendicular to the optical axis by using the OIS Hall sensor.

In the camera module according to an embodiment, an AF spring may be disposed between the AF carrier and the base, and a ball spring configured to control a movement of OIS balls disposed between the OIS carrier and the AF carrier may be provided at a corner portion of the AF spring.

In the camera module according to an embodiment, the base may include a connection portion configured to transmit at least one of external power or a control signal.

In the camera module according to an embodiment, a movement of the AF coil and a movement of the plurality of OIS coils may be mutually dependent.

In the camera module according to an embodiment, when the AF coil moves, the lens assembly may move together.

An electronic device according to an embodiment of the disclosure may include a camera module and a processor electrically connected to the camera module. The camera module include: a base defining at least a portion of a lower exterior of the camera module; a plurality of magnets disposed about an optical axis of the camera module on the base; an AF coil disposed to surround the plurality of magnets while being spaced apart from the plurality of magnets by a predetermined distance; an AF carrier coupled to the AF coil and movable along the optical axis together with the AF coil; an OIS carrier disposed to be movable in a direction perpendicular to the optical axis within a space defined by the AF coil and the AF carrier; a plurality of OIS coils coupled to an external portion of the OIS carrier to face of the plurality of magnets; and a lens assembly disposed on the OIS carrier. The processor may be configured to control a first current applied to the AF coil such that the lens assembly moves along the optical axis, and control a second current applied to the plurality of OIS coils such that the lens assembly moves in a direction perpendicular to the optical axis.

In the electronic device according to an embodiment, the camera module may include an AF spring configured to restrict a movement of the AF carrier along the optical axis, and the processor may be configured to control the first current applied to the AF coil via the AF spring.

In the electronic device according to an embodiment, the camera module may include an OIS spring configured to restrict a movement of the OIS carrier in a direction perpendicular to the optical axis, and the processor may be configured to control the second current applied to the plurality of OIS coils via the OIS spring.

In the electronic device according to an embodiment, the camera module may further include an AF Hall sensor disposed adjacent to the AF coil, and the processor may be configured to detect a position of the AF carrier along the optical axis by using the AF Hall sensor.

In the electronic device according to an embodiment, the camera module may further include an OIS Hall sensor disposed to be surrounded by at least one coil among the plurality of OIS coils, and the processor may be configured to detect a position of the OIS carrier on a plane (i.e., plan defined by x direction and y direction) perpendicular to the optical axis by using the OIS Hall sensor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A camera module comprising:
a base defining at least a portion of a lower exterior of the camera module;
a plurality of magnets disposed on the base about an optical axis of the camera module;
an auto focus (AF) coil disposed to surround the plurality of magnets while being spaced apart from the plurality of magnets by a predetermined distance;
an AF carrier coupled to the AF coil and movable along the optical axis together with the AF coil;
an optical image stabilization (OIS) carrier disposed to be movable in a direction perpendicular to the optical axis within a space defined by the AF coil and the AF carrier;
a plurality of OIS coils coupled to an external portion of the OIS carrier to face the plurality of magnets; and
a lens assembly disposed on the OIS carrier,
wherein when the AF coil moves along the optical axis relative to the magnets, the OIS coils moves together along the optical axis.

2. The camera module of claim 1, wherein the plurality of magnets includes at least two magnets disposed perpendicular to each other.

3. The camera module of claim 1, further comprising:
a first AF spring and an OIS spring, which are disposed on the AF carrier; and
a second AF spring disposed between the AF carrier and the base.

4. The camera module of claim 3, wherein the first AF spring and the second AF spring are configured to restrict a movement of the lens assembly along the optical axis, and
the OIS spring is configured to restrict a movement of the lens assembly in a direction perpendicular to the optical axis.

5. The camera module of claim 3, wherein the camera module is configured to:
control a first current applied to the AF coil based on a first control signal received through the first AF spring; and
perform an AF function based on a magnetic force generated between the AF coil and the plurality of magnets when the first current is applied to the AF coil.

6. The camera module of claim 3, wherein the camera module is configured to:
control a second current applied to the plurality of OIS coils based on a second control signal received through the first AF spring and the OIS spring; and
perform an OIS function based on a magnetic force generated between the plurality of OIS coils and the plurality of magnets when the second current is applied to the plurality of OIS coils.

7. The camera module of claim 1, wherein the AF carrier includes a first AF carrier coupled to an upper portion of the AF coil, and a second AF carrier coupled to a lower portion of the AF coil,
first OIS balls are disposed between the OIS carrier and the first AF carrier, and
second OIS balls are disposed between the OIS carrier and the second AF carrier.

8. The camera module of claim 1, wherein an AF flexible printed circuit board (FPCB) is disposed between the AF coil and the AF carrier, and
an AF driver is disposed on the AF FPCB.

9. The camera module of claim 8, wherein the AF driver includes an AF Hall sensor, and
the camera module is configured to detect a position of the lens assembly along the optical axis by using the AF Hall sensor.

10. The camera module of claim 1, further comprising:
an OIS FPCB coupled to the OIS carrier in a form of at least partially surrounding a side surface of the OIS carrier,
wherein the plurality of OIS coils and OIS drivers are disposed on the OIS FPCB.

11. The camera module of claim 10, wherein each of the OIS drivers includes an OIS Hall sensor, and
the camera module is configured to detect a position of the lens assembly on a plane perpendicular to the optical axis by using the OIS Hall sensor.

12. The camera module of claim 1, wherein an AF spring is disposed between the AF carrier and the base, and
a ball spring configured to control a movement of OIS balls disposed between the OIS carrier and the AF carrier is provided at a corner portion of the AF spring.

13. The camera module of claim 1, wherein the base includes a connection portion configured to transmit at least one of external power or a control signal.

14. The camera module of claim 1, wherein a movement of the AF coil and a movement of the plurality of OIS coils are mutually dependent.

15. The camera module of claim 1, wherein when the AF coil moves, the lens assembly moves together.

16. An electronic device comprising:
a camera module; and
a processor electrically connected to the camera module,
wherein the camera module includes:
   a base defining at least a portion of a lower exterior of the camera module;
   a plurality of magnets disposed on the base about an optical axis of the camera module;
   an AF coil disposed to surround the plurality of magnets while being spaced apart from the plurality of magnets by a predetermined distance;
   an AF carrier coupled to the AF coil and movable along the optical axis together with the AF coil;
   an OIS carrier disposed to be movable in a direction perpendicular to the optical axis within a space defined by the AF coil and the AF carrier;
   a plurality of OIS coils coupled to an external portion of the OIS carrier to face the plurality of magnets; and
   a lens assembly disposed on the OIS carrier, and
wherein the processor is configured to: control a first current applied to the AF coil such that the lens assembly moves along the optical axis; and control a second current applied to the plurality of OIS coils such that the lens assembly moves in a direction perpendicular to the optical axis,
wherein when the AF coil moves along the optical axis relative to the magnets, the OIS coils moves together along the optical axis.

17. The electronic device of claim 16, wherein the camera module includes an AF spring configured to restrict a movement of the AF carrier along the optical axis, and
the processor is configured to control the first current applied to the AF coil via the AF spring.

18. The electronic device of claim 16, wherein the camera module includes an OIS spring configured to restrict a movement of the OIS carrier in a direction perpendicular to the optical axis, and
the processor is configured to control the second current applied to the plurality of OIS coils via the OIS spring.

19. The electronic device of claim 16, wherein the camera module further includes an AF Hall sensor disposed adjacent to the AF coil, and
the processor is configured to detect a position of the AF carrier along the optical axis by using the AF Hall sensor.

20. The electronic device of claim 16, wherein the camera module further includes an OIS Hall sensor disposed to be surrounded by at least one coil among the plurality of OIS coils, and
the processor is configured to detect a position of the OIS carrier on a plane perpendicular to the optical axis by using the OIS Hall sensor.

21. The camera module of claim 1, wherein each of the plurality of magnets includes a first sub-magnet, a second sub-magnet, and a third sub-magnet arranged along the optical axis,
outer surfaces of the first sub-magnet and the third magnet have a same polarity, and an outer surface of the second sub-magnet has a polarity opposite to the polarity of the first sub-magnet.

* * * * *